United States Patent [19]

Nagano

[11] Patent Number: 4,873,890
[45] Date of Patent: Oct. 17, 1989

[54] PEDAL FOR A BICYCLE

[75] Inventor: Masashi Nagano, Izumi, Japan

[73] Assignee: Shimano Industrial Company Limited, Osaka, Japan

[21] Appl. No.: 242,815

[22] Filed: Sep. 12, 1988

[30] Foreign Application Priority Data

Sep. 14, 1987 [JP] Japan .................. 62-140644[U]

[51] Int. Cl.$^4$ .............................................. G05G 1/14
[52] U.S. Cl. ....................................... 74/594.4; 74/560
[58] Field of Search .................... 74/594.4, 594.6, 560, 74/563, 544.1

[56] References Cited

U.S. PATENT DOCUMENTS

| 527,384 | 10/1894 | Davids | 74/594.4 |
| 2,024,499 | 12/1935 | Baron | 74/594.4 |
| 2,568,443 | 9/1951 | Gerner | 74/563 |
| 3,807,255 | 4/1974 | Baginski | 74/594.4 |
| 3,811,339 | 5/1974 | Konzorr | 74/594.4 |
| 4,361,972 | 12/1982 | Miller | 74/594.4 |

FOREIGN PATENT DOCUMENTS

| 2549000 | 1/1985 | France | 74/594.4 |
| 1017581 | 5/1983 | U.S.S.R. | 74/560 |

Primary Examiner—Gary L. Smith
Assistant Examiner—Flemming Saether
Attorney, Agent, or Firm—Stevens, Davis, Miller & Mosher

[57] ABSTRACT

A pedal for a bicycle is provided which includes a shaft unit provided with a pedal shaft and a cylindrical rotary member rotatably supported to the pedal shaft and a pedal body having a foot bearing surface. The pedal body is supported to the shaft unit such that the axially inside portion of the pedal body is displaceable radially of the shaft unit at the fulcrum of the axially outside portion thereof. An elastic member is interposed between the axially inside portion of the pedal body and the shaft unit.

4 Claims, 1 Drawing Sheet

PEDAL FOR A BICYCLE

FIELD OF THE INVENTION

The present invention relates to a pedal for a bicycle, and more particularly, to a pedal for a bicycle, which provides a pedal body having a foot bearing surface which is elastically displaceable with respect to pedal shaft.

BACKGROUND OF THE INVENTION

A conventional bicycle pedal, as disclosed in Japanese Patent Publication Gazette No. Sho 62-20,957, provides a foot bearing surface of a pedal body which is elastically displaceable with respect to a pedal shaft to thereby absorb a shock given to a cyclist when he puts his foot on the foot bearing surface, and which also is elastically displaced during pedaling so as to be slanted upwardly from the axial inside to the axial outside of the pedal, thereby stopping the outward swivel moment acting on the cyclist's ankle and converting the moment into a treading force, thus effectively utilizing pedaling energy.

Such conventional bicycle pedal includes a treading portion formed at the pedal body. This treading portion is formed of an inside foot bearing surface at the crank arm mounting side and an outside foot bearing surface at the axially outside of the pedal shaft, thereby making both the inside and outside foot bearing surfaces elastically displaceable with respect to the axis of the pedal shaft. However, the inside foot bearing surface is so elastic that it is displaced, during pedaling, toward the axis of the pedal shaft with respect to the outside foot bearing surface to oppose the swivel moment acting axially outwardly of the pedal shaft.

In this pedal, the treading portion is separate from the pedal body rotatably supported to the pedal shaft and mounted to the pedal in an elastically displaceable manner. The treading portion is formed of an elastic member or an elastic member is interposed between the pedal body and a plate-like treading portion. Therefore, the elastic member is exposed to the outside from the pedal body, thereby creating a problem in that mud or the like is able to enter into the elastic member to impede its performance over a long period of use and desired satisfactory results are not obtainable. Also, since the treading portion separate from the pedal body is supported in an elastically displaceable manner, the pedal has a complex construction, poor assembly efficiency, and is expensive to produce.

SUMMARY OF THE INVENTION

An object of the invention is to provide a pedal for a bicycle which can (1) absorb a shock applied to the cyclist when he puts his foot on the foot bearing surface of the pedal body, (2) stop the swivel moment applied to the cyclist's foot when pedaling, (3) perform efficient pedaling, and (4) prevent an elastic member from being clogged with mud, thereby being superior in assembly efficiency and inexpensive to produce The pedal according to the invention is provided with a shaft unit including a pedal shaft and a cylindrical rotary member rotatably supported to the pedal shaft, a pedal body having at its outer surface a foot bearing surface and at its center portion a receiving bore for receiving therein the shaft unit, supporting means for supporting the shaft unit inserted into the receiving bore of the pedal body at the axially outside portion of the pedal shaft such that the pedal shaft is displaceable a the axially inside portion thereof radially of the pedal shaft, and an elastic member disposed at the axial inside portion of the pedal shaft in the receiving bore of the pedal body and elastically supporting the pedal body to the shaft unit.

Accordingly in the construction according to the invention, when the cyclist puts his foot on the foot bearing surface, the axially inside portion of the pedal body is elastically displaced radially of the shaft unit and at the fulcrum of the axially outside portion of the shaft unit, whereby a shock resulting from the cyclist placing his foot on the foot bearing surface is absorbed. Also, the pedal body, during pedaling, is slanted upwardly from the axially inside portion thereof to the axially outside portion, thereby stopping the swivel moment acting on the cyclist's ankle to prevent the pedaling foot from laterally outwardly shifting. Hence, a treading force is effectively transmitted to the pedal shaft thereby effectively utilizing the treading energy.

The shaft u it rotatably supporting the cylindrical rotary member to the pedal shaft is formed such that the pedal body is supported to the shaft unit in a elastically displaceable manner, thereby making the pedal simple in construction. Since the elastic member supporting the pedal body in an elastically displaceable manner is disposed in the receiving bore at the pedal body, there is no risk that the elastic member will become clogged with mud with resultant deterioration in its function whereby durability of the pedal is improved.

The above and further objects and novel features of the invention will be more fully apparent from the following detailed description when the same is read in connection with the accompanying drawings.

DETAILED DESCRIPTION OF THE PREFERRED EMBODIMENT

Figure 1:
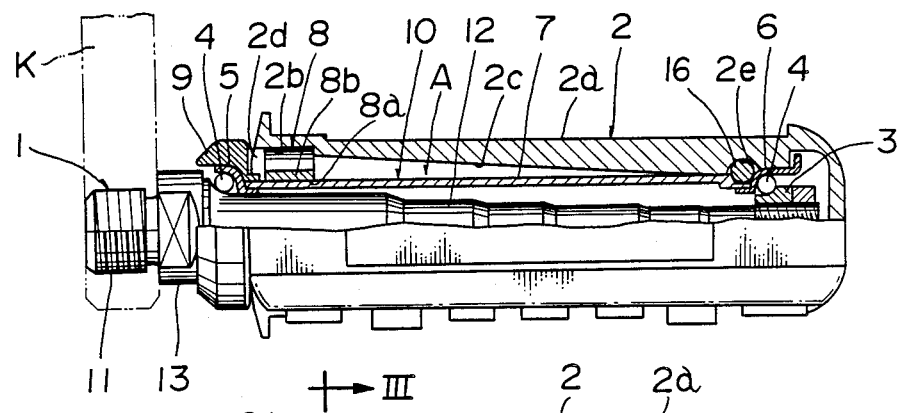
FIG. 1 is a partial sectional front view of an embodiment of a pedal according to the invention.

A pedal for a bicycle according to the invention, as shown in FIG. 1, comprises a shaft unit A provided with a pedal shaft 1 mounted to a free end of a crank arm K at a crank for the bicycle and a cylindrical rotary member 10 rotatably supported to the pedal shaft 1. A pedal body 2 has at its outer surface a foot bearing surface 2a and at its center portion a receiving bore 2c for receiving therein shaft unit A. Pedal body 2 is supported to shaft unit A such that the axial inside portion (closest to the bicycle frame) of pedal body 2 is displaceable radially of shaft unit A at the fulcrum of the axial outside portion (farthest from the bicycle frame) of shaft unit A. An elastic member 8 is interposed between the axially inside portion of pedal body 2 and shaft unit A.

Pedal shaft 1 comprises a boss 11 having a screw thread at its outer periphery and screwably fixed to crank arm K, a shaft body 12 extending axially outside form one end of boss 11 and having a shape such that it is outwardly stepwise reduced in diameter, and a rotary operating portion 13 which has a non-round section and which is provided between boss 11 and a base of shaft body 12 so as to screwably mount boss 11 to crank arm K. An inner ball race is provided at a larger diameter base of shaft body 12 in continuation of rotary operating portion 13, and a ball holder is provided which has an inner ball race screwing with the utmost end of shaft body 12.

Cylindrical rotary member 10 comprises a cylinder 7 fitted onto shaft body 12 and a pair of outer ball races 5 and 6 press-fitted into both axial ends of cylinder 7. Rotary member 10 is rotatably supported to pedal shaft 1 through balls 4 interposed between the ball race at pedal shaft 1 and outer ball race 5 and between ball holder 3 and outer ball race 6, thus forming the shaft unit A.

Figure 3:
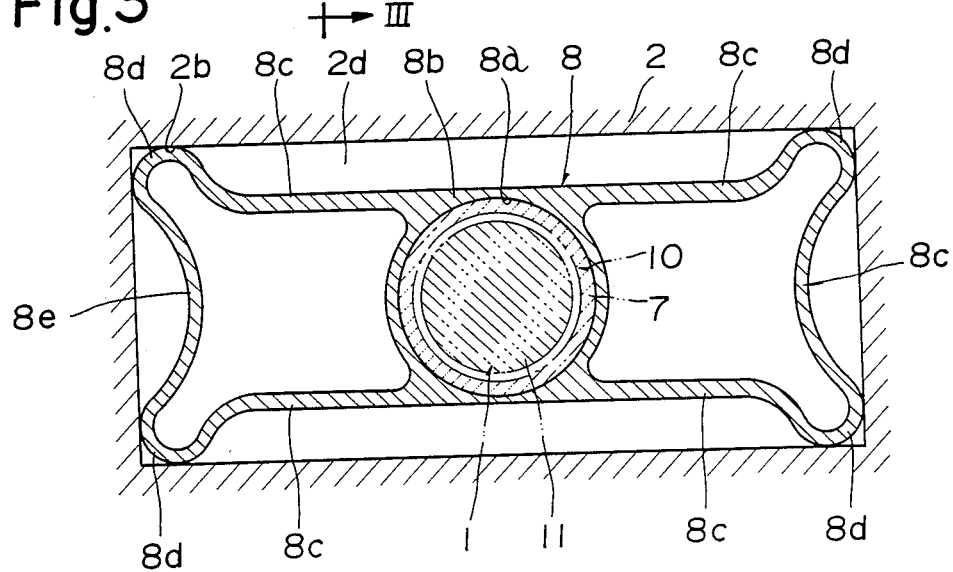
FIG. 3 is an enlarged sectional side view of the principal portion of the pedal of FIG. 1.

Elastic member 8 is formed of synthetic resin, such as Duracon (trade name), and, as shown in FIG. 3, comprises an annular boss 8b having a shaft bore 8a. Elastic member 8 is supported on the outer periphery of cylinder 7 of cylindrical rotary member 10 of shaft unit A. Elastic member 8 includes four plate-like arms 8c extending radially outwardly, that is, tangentially outwardly, from the upper surface and lower surface of boss 8b and vertically opposite to each other. Elastic member 8 also has four elastic support portions 8d connected with the utmost ends of arms 8c and swollen in a manner such that they have an approximately circular arc section as shown in FIG. 3, and plate-like elastic connectors 8e extending vertically and bent inwardly to integrally connect the elastic support portions 8d. In addition, elastic member 8 may be formed of a bent metal plate, or may employ synthetic hard rubber.

Pedal body 2 is vertically divided into two portions and is provided at the inside of each with a rectangular recess 2d having walls 2b for holding elastic support portions 8d of elastic member 8, with receiving bore 2c being in continuation of each recess 2d through a shoulder. Also, pedal body 2 forms foot bearing surfaces at upper and lower surfaces thereof.

At the axially outside portion of shaft unit A in the receiving bore 2c of pedal body 2 is provided a recess 2e into which is fitted an elastic ring 16 of rubber mounted onto the outer periphery of the axially outside portion of cylindrical rotary member 10 and serving as a fulcrum when pedal body 2 is radially displaced. Recess 2e and elastic ring 16 constitutes a support means for shaft unit A inserted into receiving bore 2c.

Figure 2:
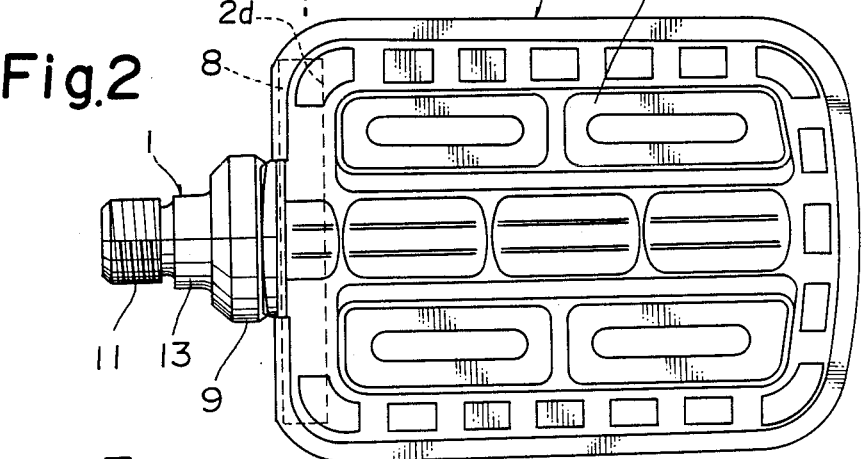
FIG. 2 is a plan view of the pedal of FIG. 1.

In addition, in FIGS. 1 and 2, reference numeral 9 designates a covered mounted to the axially inside portion of rotary member 10 and for covering recess 2d.

The aforesaid components are assembled such that shaft bore 8a of elastic member 8 is fitted onto the outer periphery of the axially inside portion of cylindrical member 10 and elastic ring 16 is fitted onto the outer periphery at the axially outside portion of cylindrical member 10. In this condition, the halves of pedal body 2 are fitted onto shaft unit A from above and below so a to contain elastic member 8 in recess 2d. Elastic support portions 8d of elastic member 8 are held by the receiving walls at recess 2d respectively. Elastic ring 16 is fitted into recess 2e and thereafter the ends of the halves of pedal body 2 are welded together.

Thus, pedal body 2 is rotatably supported to pedal shaft 1 through cylindrical rotary member 10.

When the cyclist puts his foot on foot bearing surface 2a, elastic member 8 is elastically deformed to absorb the shock occurring when the foot is put on the foot bearing surface.

Pedal body 2 is elastically deformed at its axially inside portion, that is, at side thereof at which elastic member 8 is located, by using elastic ring 16 as the fulcrum with respect to the axis of pedal shaft 1, so that during pedaling pedal body 2 is slanted such that the axially outside portion thereof is positioned higher than the axially inside portion thereof thereby ensuring that the swivel moment does not act o the cyclist's ankle and preventing his pedaling foot from shifting transversely outwardly, thus reliably transmitting the treading force to pedal shaft 1.

Since elastic member 8 is positioned in receiving bore 2c, there is no risk that elastic member 8 will become clogged with mud, thus avoiding deterioration of the functioning of this member. In addition, the assembly efficiency is improved, and the manufacturing costs are decreased.

Elastic ring 16 is not indispensable, but alternatively, the outer periphery of cup-like ball race 6 of shaft unit A may be utilized in its place to provide a abutting portion to abut against the outer periphery of outer ball race 6 at the inner surface of receiving bore 2c.

In addition, elastic member 8 is not limited in construction to the illustrated embodiment and may be provided with various different alternative constructions.

As seen from the above the pedal body of the invention constructed as described above, can absorb a shock resulting from the cyclist's foot being placed o the foot bearing surface. Also, during pedaling, pedal body 2 is displaced at the axially inside portion radially inwardly of the pedal shaft by the foot treading force, and pedal body 2 is slanted such that its axially outside portion is positioned higher than its axially inside portion, thus avoiding application of an outward swivel moment to the cyclist's ankle during pedaling since this outward swivel moment is stopped by the foot bearing surface and instead is used as an effective treading force, thereby enabling treading energy to be effectively used and efficient pedaling to be carried out.

Moreover, elastic member 8 is inserted into receiving bore 2c to thereby minimize entry of mud into the elastic member, thereby solving the problem of hindrance of its function due to collection of mud. Also, since the elastic member is interposed between the shaft unit and pedal body 2 and supports pedal body 2 in an elastically displaceable manner, the pedal has a simple construction, superior assembly efficiency, and is inexpensive to produce as a whole.

While an embodiment of the invention has been shown and described, the invention is not limited to the specific construction illustrated, since the illustrated and described embodiment is merely exemplary of the invention, and the scope of the invention is defined only by the appended claims.

I claim:

1. A pedal for a bicycle, said pedal comprising:
   a shaft unit comprising a pedal shaft and a cylindrical rotary member rotatably supported to said pedal shaft;
   a pedal body having at its outer surface a foot bearing surface and at its center portion a receiving bore in which said shaft unit is inserted;
   support means for supporting said shaft unit inserted into said receiving bore of said pedal body at an axial outside portion of said pedal shaft to enable a portion of said pedal body disposed axially inward of said axial outside portion of said pedal shaft to be displaceable radially of said pedal shaft more than a portion of said pedal body located at said axial outside portion of said pedal shaft; and an elastic member disposed at an axial inside portion of said pedal shaft within said receiving bore of said pedal body and comprising means for elastically supporting said pedal body relative to said shaft unit.

2. A pedal according to claim 1, wherein said support means comprises an elastic ring interposed between an outer periphery of said cylindrical rotary member and an inner periphery of said receiving bore of said pedal body.

3. A pedal according to claim 2, wherein said receiving bore includes an annular recess provided at its inner periphery, said pedal further comprises means for holding said elastic ring at said outer periphery of said cylindrical rotary member, said elastic ring being disposed in said recess of said receiving bore.

4. A pedal according to claim 1, wherein said elastic member comprises (i) a boss disposed on said outer periphery of said cylindrical rotary member of said shaft unit, (ii) a plurality of arms extending horizontally outwardly from said boss, and (iii) a plurality of elastic support portions respectively in continuation of utmost ends of said arms remote from said boss having swollen circular arc configurations respectively, said pedal body comprising a recess which is in continuation of said receiving bore and which has an inner wall against which each of said elastic support portions elastically abuts.

* * * * *